(12) United States Patent
Haynes et al.

(10) Patent No.: US 9,702,309 B2
(45) Date of Patent: Jul. 11, 2017

(54) ENGINE VALVE DEACTIVATION SYSTEM (71) Applicant: Ford Global Technologies, LLC, Dearborn, MI (US)

(72) Inventors: Neil Haynes, Benfleet (GB); Phil John Whiston, Ingatestone (GB)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 14/546,527

(22) Filed: Nov. 18, 2014

(65) Prior Publication Data

US 2015/0144081 A1 May 28, 2015

(30) Foreign Application Priority Data

Nov. 28, 2013 (GB) .................................. 1320970.5

(51) Int. Cl.
| | |
|---|---|
| *F01L 1/18* | (2006.01) |
| *F02D 41/00* | (2006.01) |
| *F01L 9/02* | (2006.01) |
| *F01L 9/04* | (2006.01) |
| *F02D 13/06* | (2006.01) |
| *F01L 13/00* | (2006.01) |

(52) U.S. Cl.
CPC ............ *F02D 41/0087* (2013.01); *F01L 9/02* (2013.01); *F01L 9/04* (2013.01); *F01L 13/0005* (2013.01); *F02D 13/06* (2013.01); *F01L 2013/001* (2013.01); *F02D 2041/001* (2013.01); *F02D 2041/0012* (2013.01); *Y02T 10/18* (2013.01)

(58) Field of Classification Search
CPC ........ F02D 41/0087; F02D 13/06; F01L 9/02; F01L 9/04
See application file for complete search history.

(56) References Cited

U.S. PATENT DOCUMENTS

| | | |
|---|---|---|
| 6,557,518 B1 | 5/2003 | Albertson et al. |
| 8,118,002 B2 | 2/2012 | Lee et al. |
| 2006/0144356 A1 | 7/2006 | Sellnau et al. |
| 2009/0031982 A1* | 2/2009 | Neal ..................... F01L 1/2405 123/196 M |
| 2013/0306037 A1 | 11/2013 | Gelez et al. |

FOREIGN PATENT DOCUMENTS

GB          2367859 A          4/2002

* cited by examiner

*Primary Examiner* — Zelalem Eshete
(74) *Attorney, Agent, or Firm* — Greg Brown; McCoy Russell LLP (57) ABSTRACT

A system and method comprising four valves per cylinder of a multi-cylinder engine is provided to control cylinder intake and exhaust valves independently from other cylinders in response to engine operating conditions. The engine valve deactivation system for the engine may comprise two or more cylinders wherein each cylinder has two exhaust valves and two inlet valves. The system and method may allow for cylinder deactivation and/or high swirl to both be delivered.

19 Claims, 5 Drawing Sheets

ENGINE VALVE DEACTIVATION SYSTEM

CROSS REFERENCE TO RELATED APPLICATIONS

The present application claims priority to Great Britain Application No. 1320970.5, "AN ENGINE VALVE DEACTIVATION SYSTEM," filed Nov. 28, 2013, the entire contents of which are hereby incorporated by reference for all purposes.

FIELD

The present application relates to an internal combustion engine having four poppet type gas flow valves per cylinder and to a system for selectively deactivating one or more of the gas flow valves of the engine.

BACKGROUND\SUMMARY

Deactivation of one or more cylinders of an engine may reduce emissions and improve fuel economy. During cylinder deactivation, the air charge in operating cylinders increases resulting in higher thermal efficiency and lower pumping losses, thereby decreasing fuel consumption. Further, the use of exhaust-gas recirculation (EGR) may provide additional fuel economy by introducing exhaust gas products back into the cylinders of the engine. Increasing swirl in the cylinder during low load and EGR conditions, for example when the deactivatable cylinders are deactivated, may promote effective combustion of fuel.

For example, Albertson in U.S. Pat. No. 6,557,518 discloses a system to deactivate a cylinder by disabling an intake and exhaust valve of the deactivatable cylinder by disabling hydraulic lash adjusters. Thus, the intake and exhaust valves are simultaneously closed.

However, the inventors herein have recognized a potential issue with Albertson et al. The disclosed system does not allow for increased swirl in cylinders as the intake and exhaust valve are both disabled when a cylinder is deactivated.

One potential approach to at least partially address some of the above issues includes systems and methods of providing an improved valve deactivation system for an engine wherein cylinder deactivation and/or high swirl may both be delivered. The engine valve deactivation system for an engine comprising two or more cylinders wherein each cylinder has two exhaust valves and two inlet valves. The at least one deactivatable cylinder has one inlet valve selectively deactivated by means of a first supply of pressurized fluid and both the exhaust valves and the other one of the inlet valves are selectively deactivated by means of a second supply of pressurized fluid.

For example, the first supply of pressurized fluid may be used to deactivate the one inlet valve during engine operating conditions where an increase in swirl in the cylinder is desired, such as at light load and EGR being supplied. The second supply of pressurized fluid and the first supply of pressurized fluid may be used to deactivate a cylinder under low load. Thus, a system is provided which allows for cylinder deactivation or high swirl to be delivered.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

DETAILED DESCRIPTION

The following detailed description provides information regarding a system which incorporates both cylinder deactivation and increase swirl and the operation methods thereof. An example of a cylinder in an internal combustion engine is provided in FIG. 1 with an example motor vehicle provided in FIG. 2, which may have a valve deactivation system incorporating both cylinder deactivation and increase swirl, for example, as illustrated in FIG. 3. The system may be controlled in response to engine load and/or speed as outlined in the example methods illustrated in FIGS. 4 and 5.

Deactivating one or more cylinders of an engine may be desirable in order to reduce emissions and save fuel when the engine is operating at low load. For example, Albertson et al in U.S. Pat. No. 6,557,518 discloses a system for deactivating two cylinders of an engine by disabling hydraulic lash adjusters for the deactivatable cylinders when it is required to disable the respective cylinder by keeping the inlet and exhaust valves of the respective cylinder closed. In light load drive conditions by keeping the intake and exhaust valves closed (cylinder deactivation) pumping losses may be reduced by preventing air from entering or exiting the deactivated cylinder.

In another example, Lee et al in U.S. Pat. No. 8,118,002 discloses in-cylinder turbulence (swirl) may be improved by deactivating one of the intake or inlet gas flow valves so as to produce an unbalanced flow that creates a strong swirl within the cylinder by keeping the deactivated valve closed.

For example, in light load conditions, it may be desirable to induce a high level of swirl in the cylinders because this may promote effective combustion of fuel.

An additional fuel economy feature which may be used may be to introduce exhaust gas recirculation (EGR) products back into the cylinders of an engine. This process may be improved if high swirl is produced in the cylinders by keeping one of the inlet valves closed, as improved mixing may result from the increased swirl.

Cylinder deactivation or high swirl may therefore both be delivered by the use of switchable hydraulic lash adjusters (HLAs) or switchable roller finger followers (RFFs) for the valve to be deactivated.

It is an object of the invention to provide an improved valve deactivation system for an engine.

According to a first aspect of the invention there is provided an engine valve deactivation system for an engine having two or more cylinders, each cylinder having two exhaust valves and two inlet valves. At least one cylinder of the engine being a deactivatable cylinder wherein each deactivatable cylinder has one inlet valve selectively deactivated by means of a first supply of pressurized fluid and both exhaust valves and the other one of the inlet valves are selectively deactivated by means of a second supply of pressurized fluid.

Each cylinder may have a device to selectively deactivate a first one of the two inlet valves so as to keep the respective inlet valve closed, each deactivatable cylinder may have respective deactivation devices to selectively deactivate both exhaust valves and a second one of the two inlet valves so as to keep the respective second inlet valve and both exhaust valves closed, a first electronically controlled valve may be arranged to control the flow of pressurized fluid to the devices for deactivating the first inlet valve of each cylinder, a second electronically controlled valve may be arranged to control the flow of pressurized fluid to the devices for deactivating the second inlet valve and both of the exhaust valves and an electronic controller may be arranged to control the operation of the first and second electronically controlled valves.

The electronic controller may be operable in a first mode of operation to control the first electronically controlled valve to deactivate all of the associated inlet valves when increased swirl is required in the cylinders of the engine.

The electronic controller may be operable in a second mode of operation when deactivation of the deactivatable cylinder is required, to control the first electronically controlled valve to deactivate the first inlet valves in all cylinders of the engine and to control the second electronically controlled valve to deactivate the second inlet valve and both of the exhaust valves of the cylinder to be deactivated.

The engine may have more than one deactivatable cylinder and the electronic controller may be operable in a second mode of operation when deactivation of the deactivatable cylinders is required, to control the first electronically controlled valve to deactivate the first inlet valves in all cylinders of the engine and to control the second electronically controlled valve to deactivate the second inlet valves and both of the exhaust valves of all of the cylinders to be deactivated.

Each valve of the engine may have a valve actuating system including a hydraulic lash adjuster and the devices to deactivate the first inlet valves of the cylinders of the engine may be hydraulically switchable hydraulic lash adjusters.

The devices to deactivate the second inlet valve and both exhaust valves of each deactivatable cylinder of the engine may be hydraulically switchable hydraulic lash adjusters.

Each valve of the engine may have a valve actuating system including a roller finger follower and the devices to deactivate the first inlet valves of the cylinders of the engine may be hydraulically switchable roller finger followers.

The devices to deactivate the second inlet valve and both exhaust valves of each deactivatable cylinder of the engine may be hydraulically switchable roller finger followers.

The first electronically controlled valve may be operable to supply fluid at pressure to the devices for deactivating the first inlet valves when deactivation of the first inlet valves is required and cut-off the supply of fluid at pressure to the devices for deactivating the first valves when the first valves are required to operate normally.

The second electronically controlled valve may be operable to supply pressurized fluid to the devices for deactivating the second inlet valve and both of the exhaust valves when deactivation of the second inlet valve and both of the exhaust valves is required and cut-off the supply of fluid at pressure to the devices for deactivating the second inlet valve and both of the exhaust valves when the first valves are required to operate normally.

The electronic controller may comprise more than one electronic controller.

According to a second aspect of the invention there is provided a motor vehicle having an engine including a valve deactivation system constructed in accordance with said first aspect of the invention.

The invention will now be described by way of example with reference to the accompanying drawings.

Figure 1:
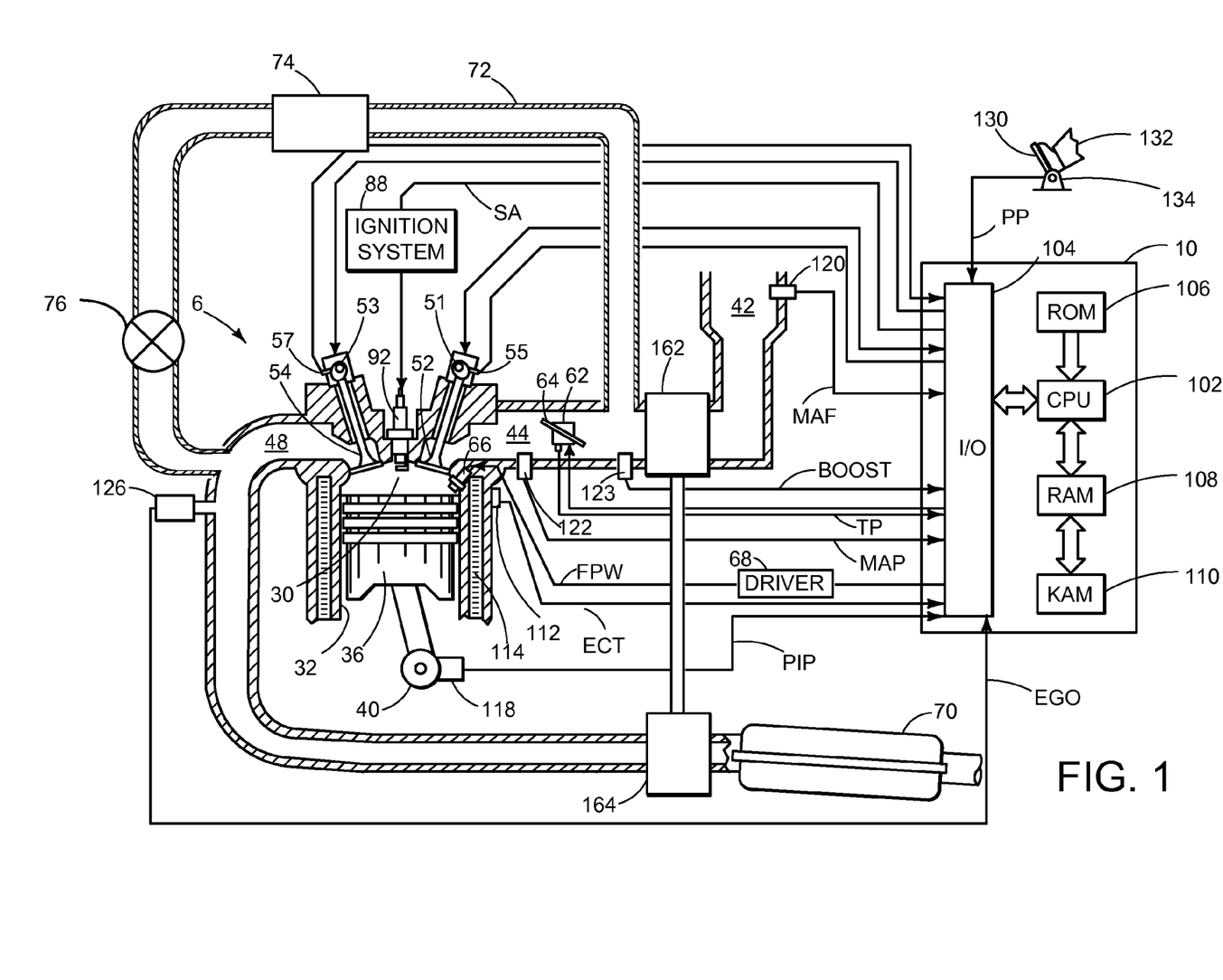
FIG. 1 schematically illustrates a diagram of an example cylinder of an internal combustion engine.

Turning to FIG. 1, a schematic diagram showing one cylinder of multi-cylinder internal combustion engine 6 is provided. Engine 6 may be controlled at least partially by a control system including controller 10 and by input from a vehicle operator 132 via an input device 130. In this example, input device 130 includes an accelerator pedal and a pedal position sensor 134 for generating a proportional pedal position signal PP.

Combustion cylinder 30 of engine 6 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 6.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), valve deactivation (VDT), variable valve timing (VVT) and/or variable valve lift (VVL) systems that may be operated by controller 10 to vary valve operation. The position of intake valve 52 and exhaust valve 54 may be determined by position sensors 55 and 57, respectively or via camshaft sensors. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS, VDT, and/or VCT systems.

Combustion cylinder 30 includes a fuel injector 66 arranged on the side of the combustion chamber in a configuration that provides what is known as direct injection of fuel into the combustion cylinder 30. Fuel injector 66 injects fuel therein in proportion to the pulse width of signal FPW received from controller 10 via electronic driver 68. In other examples, the fuel injector may be mounted in the top of the combustion cylinder, for example, to provide direct injection of fuel into combustion cylinder 30. Alternatively or additionally, the fuel injector may be arranged in intake passage 42 in a configuration that provides what is known as port injection of fuel into the intake port upstream of the combustion chamber 30. Fuel may be delivered to fuel injector 66 by a fuel delivery system (not shown) including a fuel tank, a fuel pump, and a fuel rail.

Intake passage 42 may include a throttle 62 having a throttle plate 64. In this particular example, the position of throttle plate 64 may be varied by controller 10 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 10.

Ignition system 88 can provide an ignition spark to combustion chamber 30 via spark plug 92 in response to spark advance signal SA from controller 10, under select operating modes. Though spark ignition components are shown, in some embodiments, combustion chamber 30 or one or more other combustion chambers of engine 6 may be operated in a compression ignition mode, with or without an ignition spark.

Exhaust gas sensor 126 is shown coupled to exhaust passage 48 upstream of catalytic converter 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. The exhaust system may include light-off catalysts and underbody catalysts, as well as exhaust manifold, upstream and/or downstream air-fuel ratio sensors. Catalytic converter 70 can include multiple catalyst bricks, in one example. In another example, multiple emission control devices, each with multiple bricks, can be used. Catalytic converter 70 can be a three-way type catalyst in one example.

Controller 10 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 10 may receive various signals and information from sensors coupled to engine 6, in addition to those signals previously discussed, including measurement of inducted mass air flow (MAF) from mass air flow sensor 120; engine coolant temperature (ECT) from temperature sensor 112 coupled to water jacket 114 (i.e., a cooling sleeve); a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof. The engine cooling sleeve 114 may be coupled to a cabin heating system.

Engine 6 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression (e.g., boost) provided to one or more cylinders of the engine via a turbocharger or supercharger may be varied by controller 10. Further, a sensor 123 may be disposed in intake manifold 44 for providing a boost signal to controller 10.

Depending of the operating conditions of the engine, some of the exhaust gas from exhaust passage 48 may be diverted from the exhaust passage upstream the turbine 164 to an exhaust gas recirculation (EGR) passage 72 through EGR valve 76 and EGR cooler 74 to the intake manifold 44 downstream of the compressor 162. The EGR passage 72 is depicted as a high pressure (HP) EGR system. In another example, engine 6 may include a low pressure (LP) EGR system in which exhaust gas is routed from downstream of the turbine 164 to the intake passage upstream of the compressor 162.

Regarding engine 6 of FIG. 1, it is noted that various components may be added, removed, and/or changed according to specific engine embodiments. For example, the turbocharging system including compressor 162 and turbine 164 may be removed for engines that are naturally aspirated. In another example, for diesel engine applications, engine 6 may consume diesel as its fuel. Furthermore, spark plug 92 may be removed from FIG. 1 and other components such as a glow plug (not shown) may be included in the diesel embodiment of engine 6 to provide heat for cold starting the engine. Alternatively, a port injection system may be added to engine 6, wherein a port injector (not shown) may be provided in the intake passage with appropriate controls from controller 10. These changes and others may be made while not departing from the scope of the present disclosure.

Figure 2:
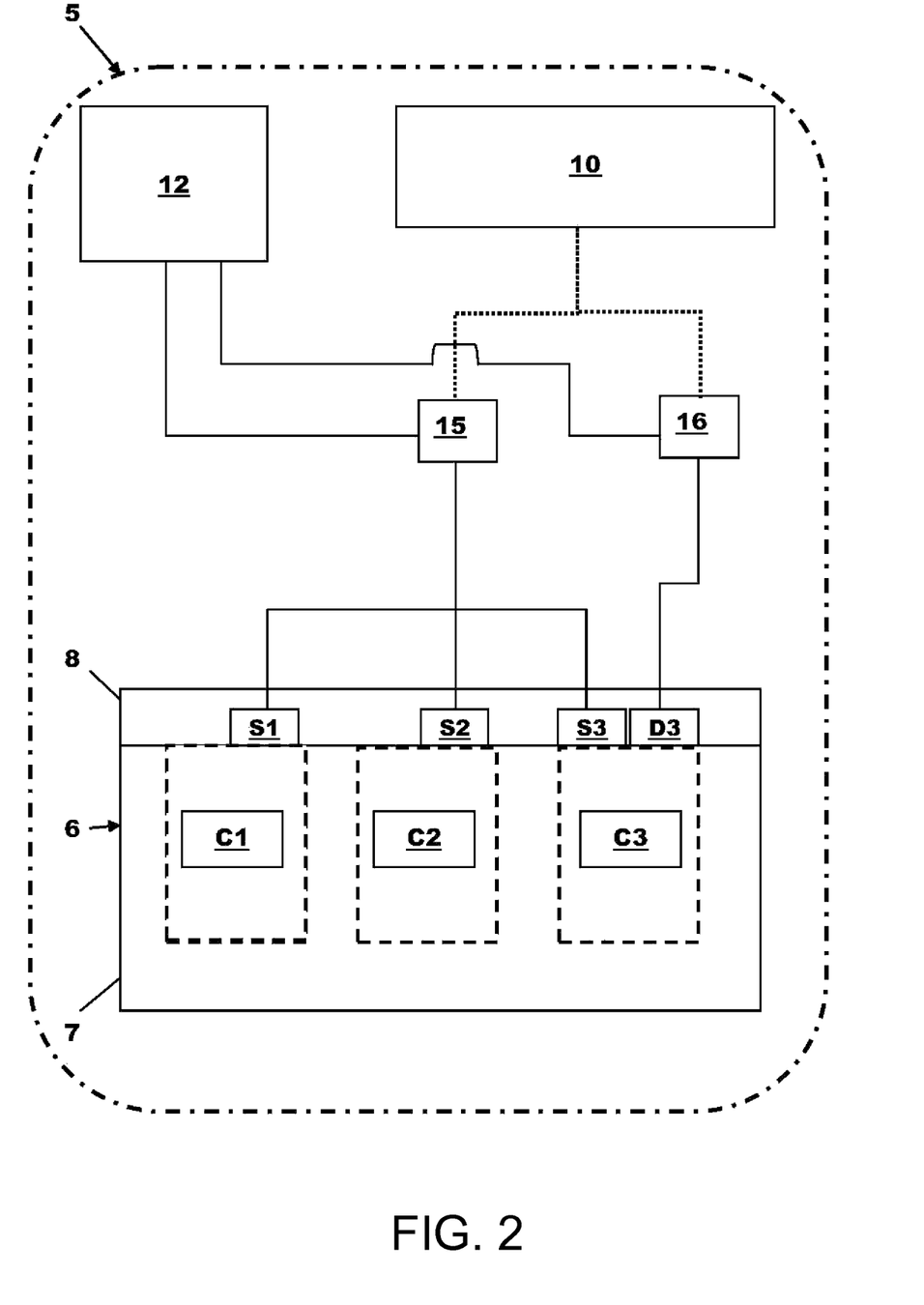
FIG. 2 schematically illustrates a diagram of a motor vehicle in accordance with a second aspect an engine having a valve deactivation system in accordance with a first aspect of the invention.
Figure 3:
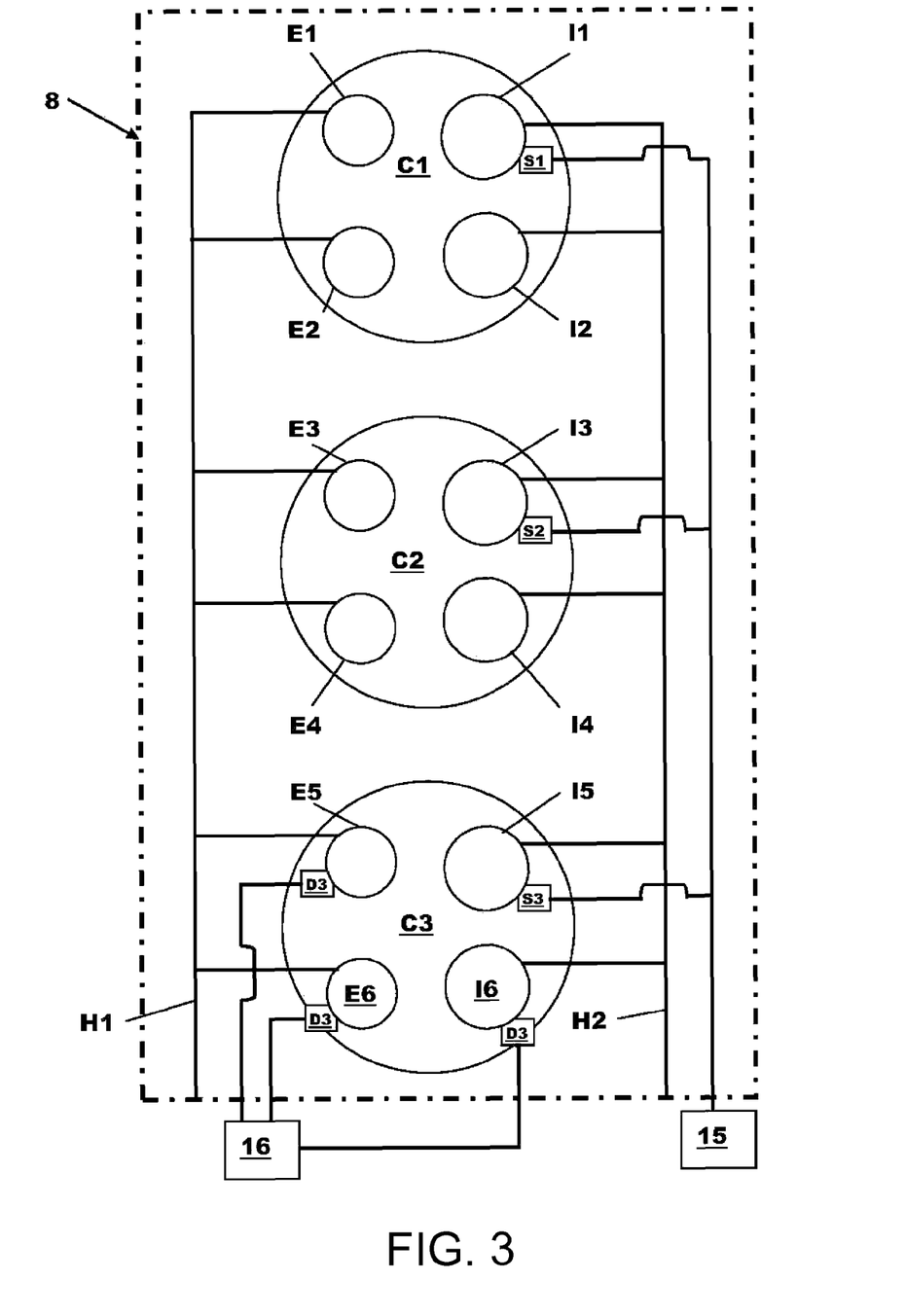
FIG. 3 schematically illustrates a diagram of the hydraulic circuit of the valve deactivation system shown in FIG. 1.

With reference to FIGS. 2 and 3 there is shown a motor vehicle 5 having a multi-cylinder internal combustion engine 6 having a cylinder block 7 and a cylinder head 8. In this example, the engine has three cylinders C1, C2 and C3, for example, a cylinder as described in FIG. 1, each of which is provided with four gas flow valves E1 to E6 and I1 to I6. In other examples, the engine may have four cylinders. In yet another example, the engine may have more than four cylinders.

A first cylinder C1 has two inlet valves I1, I2 and two exhaust valves E1, E2, a second cylinder C2 has two inlet valves I3, I4 and two exhaust valves E3, E4 and a third cylinder C3 has two inlet valves I5, I6 and two exhaust valves E5, E6.

All of the valves I1 to I6 and E1 to E6 include a valve actuation mechanism including in this example case a hydraulic lash adjuster (HLA). However, in other embodiments a roller finger follower (RFF) may be used instead of an HLA.

A first hydraulic supply H1 supplies oil at pressure to the HLAs associated with the exhaust valves E1 to E6 and a second hydraulic supply H2 supplies oil at pressure to the HLAs associated with the inlet valves I1 to I6. The normal operation of the HLAs and the method of their control are conventional in nature and are not described in further detail.

The oil supplies H1 and H2 may be provided via passageways or oil galleries formed in the cylinder head 8 of the engine 6.

In addition to the oil supply H2 for the inlet valves I1, I3 and I5, a further oil supply is provided via an electronically controlled valve 15 for use in deactivating the inlet valves I1, I3, I5. This further oil supply is used to switch or deactivate swirl HLAs S1, S2, S3 for the inlet valves I1, I3 and I5. Oil is supplied from a source of pressurized fluid 12 in response to a control signal from an electronic controller 10 via the electronically controlled valve 15. That is to say, the electronically controlled valve 15 opens to permit oil, at pressure, to flow from the source of pressurized fluid 12 to the HLAs S1, S2, S3, thereby switching their state from normal operation to deactivated. The additional oil supply from the electronically controlled valve 15 to the HLAs S1, S2, S3 may be provided, at least partially, via passageways or oil galleries formed in the cylinder head 8.

A number of inputs (not shown) are connected to the electronic controller 10 to provide information regarding the current and requested operating conditions of the engine 6. The inputs are used by the electronic controller 10 to control the operation of the engine 6 and the opening and closing of the electronically controlled valve 15 and a further cylinder deactivation electronically controlled valve 16.

The means for switching or deactivating the HLAs S1, S2 and S3 associated with the inlet valves I1, I3 and I5 may be of any known means such as, for example and without limitation, for example, the type shown in U.S. Pat. No. 8,118,002 or the type as shown in U.S. patent publication 2013/0186359.

Figure 4:
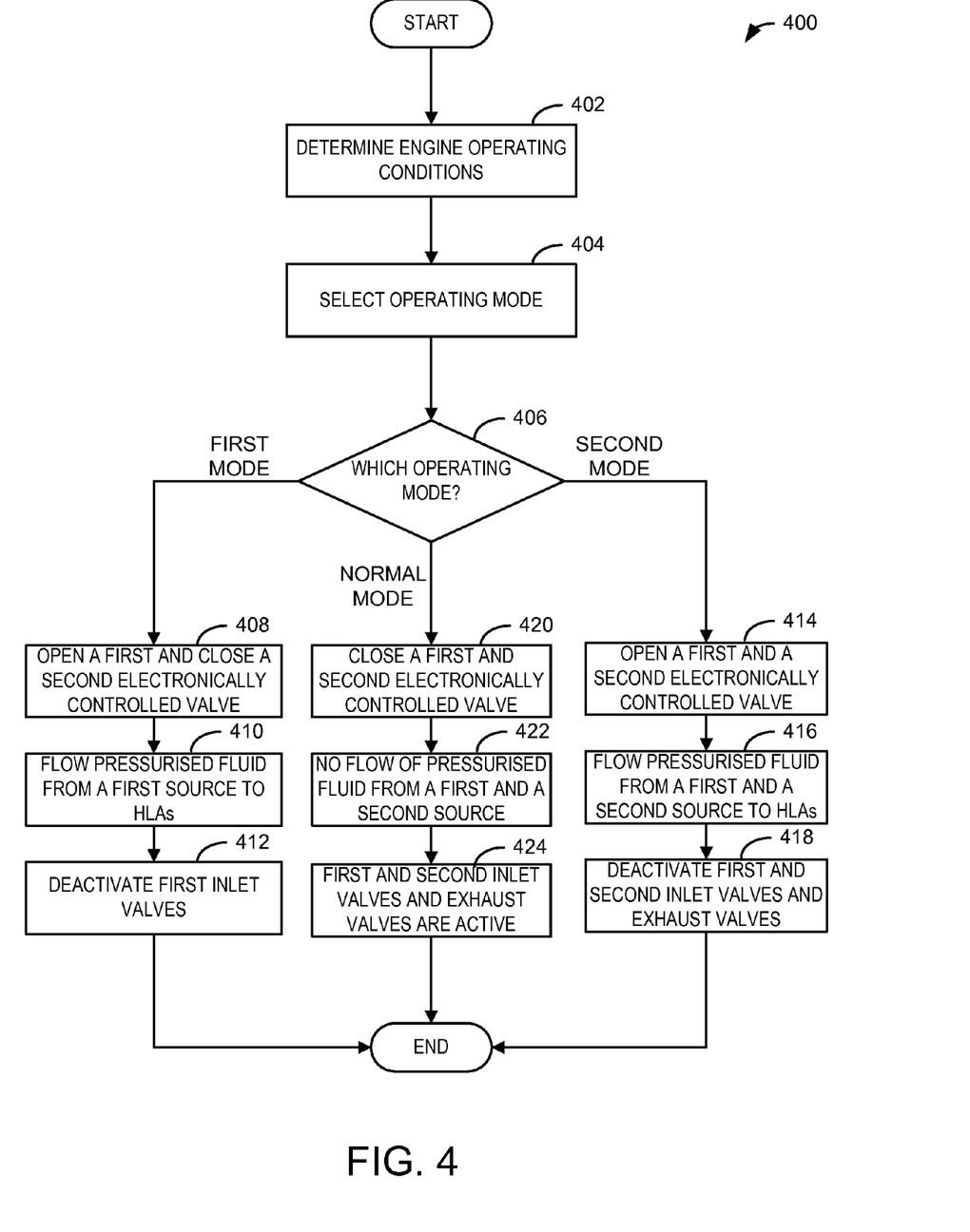
FIG. 4 illustrates an example method for controlling the disclosed hydraulic circuit of the valve deactivation system.

Turning to FIG. 4, an example method 400 is provided for operating the system as described above in FIG. 3. In example method 400, three operational modes are provided based on the engine operating conditions for the control of the engine valve deactivation system.

At 402, the method may determine the engine operating conditions. For example, the method may determine the engine load, engine speed, EGR rate, etc.

At 404, the method may select an operating mode based on the determined engine operating conditions. In one example, the engine load may be used to select the operating mode. In another example, the engine load as well as the EGR rate may be used to select the operating mode. In yet another example, the engine speed may be used to select the operating mode.

At 406, the method may determine which operating mode was selected at 404. If the first mode of operation is selected, the method may proceed to 408. If the second mode of operation is selected, the method may proceed to 414. If a normal mode of operation is selected, the method may proceed to 420.

At 408, in a first mode of operation, the controller may send a signal to the first electronically controlled valve to open and to the second electronically controlled valve to close. At 410, the method may flow a pressurized fluid from a first source through the open first electronically controlled valve to the HLAs. The HLAs are thus switched from normal operation to deactivated.

At 412, the method may deactivate the first inlet valves in all the cylinders. Thus, the first inlet valves are deactivated and swirl in the cylinder may be increased. For example, when the respective inlet valve I1, I3, I5 is deactivated, the inlet will remain closed thereby increasing swirl within the respective cylinder C1, C2, C3 when the other inlet valve I2, I4, I6 opens.

When the electronic controller 10 operates so as to deactivate the inlet valves I1, I5 and I5 to increase swirl it is said to be operating the system in a first mode of operation. In the first mode of operation one of the inlet valves I1, I3, I3 in each of the cylinders C1, C2, C3 is deactivated to increase swirl within the respective cylinder C1, C2, C3.

It will be appreciated that an alternative arrangement could be used in which the inlet valves I2, I4, I6 are deactivatable and the inlet valves I1, I3, I5 are non-deactivatable.

At 414, in a second mode of operation, the controller may send a signal to a first and second electronically controlled valve to open.

At 416, the method may flow a pressurized fluid from a first and second source through the open first and second electronically controlled valve to the HLAs. The HLAs are thus switched from normal operation to deactivated.

At 418, the method may deactivate the first and second inlet valves and the exhaust valves of the deactivatable cylinders. Thus, the deactivatable cylinders are deactivated in the second mode of operation.

For example, the electronic controller 10 may be operable to deactivate one of the cylinders C3 of the engine 6 in which case the system is said to be operating in a second mode of operation.

In order to provide cylinder deactivation a further oil supply is provided from the source of pressurized fluid via the electronically controlled valve 16 to the HLAs D3 of both exhaust valves E5 and E6 and the inlet valve I6 of the third cylinder C3 to switch or deactivate the HLAs D3.

This further oil supply switches or deactivates the HLAs D3 of the exhaust valves E5 and E6 and inlet valve I6 to which it is supplied via the electronically controlled valve 16 in response to a control signal from the electronic controller 10 and thereby deactivates the gas flow valve E5, E6 and I6 with which they are associated.

In this case the same source of hydraulic pressure 12 is used in this case to supply oil to these cylinder deactivation HLAs D3 as is used for the HLAs S1, S2, S3 used for increasing swirl but it will be appreciated that separate sources of pressurized fluid could be used.

The additional oil supply from the electronically controlled valve 16 to the HLAs D3 associated with the exhaust valves E5 and E6 and the inlet valve I6 is provided, at least partially, via passageways or oil galleries formed in the cylinder head 8.

It will be appreciated that the HLAs (D3) for the valves E5, E6 and I6 are the same as those used for the valves I1, I3, I5 in that they enable the valve with which they are associated to be deactivated so that it stays closed.

The deactivation of the HLAs S1, S2, S3; D3 is preferably as described above by the application of pressure or increased pressure to the HLAs S1, S2, S3; D3 however it will be appreciated that the opposite functionality could be used with the removal or reduction of pressure being used to switch or deactivate the HLAs S1, S2, S3; D3.

The means for deactivating the HLAs D3 associated with the exhaust valves E5 and E6 and the inlet valve I6 can be of any known means such as, for example, that referred to above with respect to the first mode of operation.

When the respective exhaust valve E5, E6 and the inlet valve I6 are deactivated by their respective HLA (D3) they will remain closed.

At 420, in a normal mode of operation, the method may close a first and second electronically controlled valve.

At 422, the method may have no flow of a pressurized fluid from a first and a second source.

At 424, the first and second inlet valves and exhaust valves are active. The normal operation of the HLAs and the method of their control are conventional in nature and are not described in further detail. Method 400 may then end.

Figure 5:
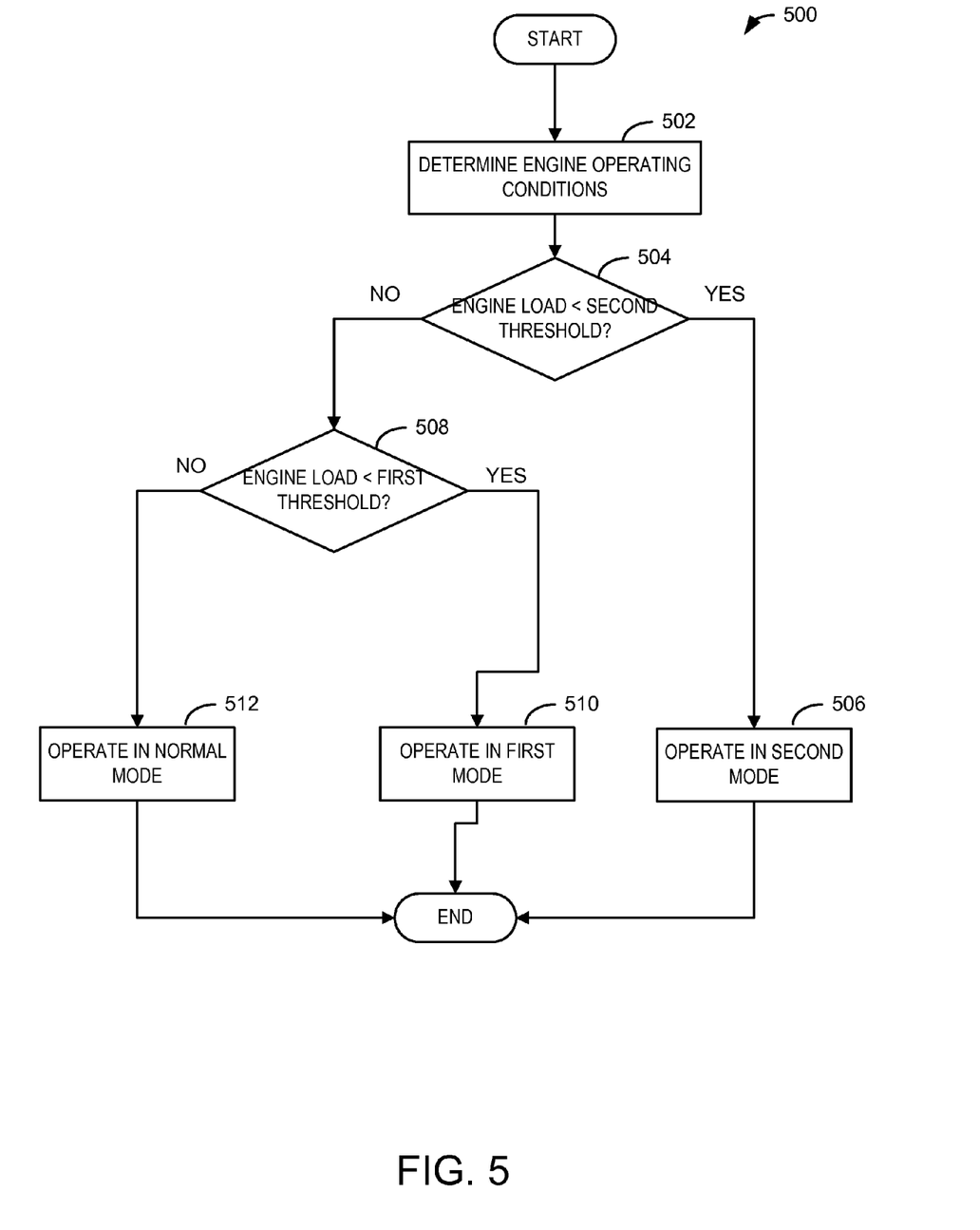
FIG. 5 illustrates an example method for determining a mode of operation for the disclosed hydraulic circuit of the valve deactivation system when EGR is used.

Turning to FIG. 5, example method 500 is provided for selecting an operating mode based on engine load. In another example, the method may include selecting an operating mode based on engine load and EGR rate. For example, when predefined conditions exist, which may be the engine 6 operating with EGR at relatively low load, the electronic controller 10 may be operable to deactivate the inlet valves I1, I3 and I5 by means of the HLAs S1, S2 and S3. Thus, by keeping the inlet valves I1, I3 and I3 closed while the other inlet valves I2, I4 and I6 operate normally swirl is increased within the three cylinders C1, C2, C3 thereby promoting mixing of the recycled exhaust gases with the fresh air and fuel in the respective cylinder C1, C2, C3. However, it will be appreciated that swirl may be increased whenever required in the same manner, even if EGR is not occurring or is not available. In another example, the method may include selecting an operating mode based on engine load and engine speed.

At 502, the method may determine the engine operating conditions. For example, the engine load may be determined.

At 504, the method may determine if the engine load is less than a second threshold. For example, the second threshold may be chosen such that below the second threshold it is desirable to deactivate the deactivatable cylinder.

If yes at 504, the engine load is below a second threshold, the method may proceed to 506 and operate in the second mode, as previously described. Method 500 may then end. Thus, when predefined conditions exist, which may be the engine 6 operating below a predefined low load level it is desirable to deactivate the deactivatable cylinder C3. The electronic controller 10 is then operable in the second mode of operation to deactivate the exhaust valves E5 and E6 and the inlet valve I6 by means of the HLAs D3. To do this the electronically controlled valve 16 is commanded by the electronic controller 10 to supply hydraulic fluid at pressure from the source of hydraulic pressure 12 to the HLAs D3.

It will be appreciated that as before an alternative arrangement could be used in which to deactivate the exhaust valves E5 and E6 and the inlet valve I6 pressure is cut-off to the HLAs D3 by the electronic valve 16 rather than being increased or enabled.

When cylinder deactivation is required it may also be desirable to promote a high level of swirl in the cylinders C1, C2 that are operating normally and so at the same time as the electronically controlled valve 16 is opened by the electronic controller 10, the electronically controlled valve 15 is opened by the electronic controller 10 thereby deactivating the inlet valves I1, I3 and I5 by means of the HLAs S1, S2 and S3 as previously described.

Therefore in the case of cylinder C3 the two exhaust valves E5 and E6 and the inlet valve 16 are kept closed by the cylinder deactivation HLAs D3 and the remaining inlet valve I5 is kept closed by the swirl HLA S3 so that none of the gas flow valves E5, E6, I5, I6 are open and the cylinder C3 is deactivated.

If no at 504, the engine load is not below a second threshold, the method may proceed to 508 and determine if the engine load is below a first threshold. In one example, the first threshold may be a light load where increased swirl in the cylinder is desired. In another example, the first threshold may be based on the engine load and EGR rate where increased swirl in the cylinder is desired. The first threshold may be greater than the second threshold in some examples.

If yes at 508, the engine load is below a first threshold, the method may proceed to 510 and operate in a first mode, as previously described. Method 500 may then end.

If no at 508, the method may proceed to 512 and operate in a normal mode. Method 500 may then end.

Further, during operation of the engine 6, the electronic controller 10 may control operation of the engine 6 so as to meet driver demands which may comprise adjusting the rate and timing of fuel to the cylinders C1, C2, C3 of the engine 6, the rate of air supply to the engine 6, the timing of ignition to each cylinder C1, C2, C3 of the engine 6 or any combination of these depending upon the type of engine used.

As previously referred to the current application may be equally applicable to engines in which valves roller finger followers (RFFs) are used to deactivate selected gas flow valves. See, for example, U.S. Pat. No. 7,909,007 for one example of a RFF for deactivating a poppet type gas flow valve.

Although the invention has been described with reference to a single electronic controller to control the operation of the engine 6 and the two electronically controlled valves 15, 16, it will be appreciated that there could be two or more electronic controllers operable in combination to perform the operations described above. It will also be appreciated that the electronic controller could form part of an engine control unit or engine management system.

Although the invention has been described by way of example to a three cylinder engine in which one of the end cylinders is deactivated, it will be appreciated that it is not limited to such an arrangement.

For example as shown and described in UK patent publication 2,496,407 the inner cylinder of a three cylinder engine could be selectively deactivatable.

Furthermore, the engine may have more than three cylinders in which case one or more cylinders may be deactivatable.

As yet another alternative, the engine may have only two cylinders of which one is deactivatable.

It will be appreciated by those skilled in the art that although the invention has been described by way of example with reference to one or more embodiments it is not limited to the disclosed embodiments and that alternative embodiments could be constructed without departing from the scope of the invention as defined by the appended claims.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine valve deactivation system for an engine comprising:
two or more cylinders, each cylinder having two exhaust valves and two inlet valves, and at least one cylinder of the engine being deactivatable at a same time that a remaining set of the cylinders is normally operated,
wherein each of the cylinders has one inlet valve selectively deactivated via a first supply of pressurized fluid, and wherein each deactivatable cylinder further has both exhaust valves and the other one of the inlet valves selectively deactivated via a second supply of pressurized fluid.

2. The system of claim 1, in which each cylinder further comprises a device to selectively deactivate a first one of the two inlet valves so as to keep the respective inlet valve closed,
each deactivatable cylinder has respective deactivation devices to selectively deactivate both exhaust valves and a second one of the two inlet valves so as to keep the respective second inlet valve and both exhaust valves closed, wherein a first electronically controlled valve is arranged to control a flow of pressurized fluid to the devices for deactivating the first inlet valve of each cylinder, a second electronically controlled valve is arranged to control the flow of pressurized fluid to the devices for deactivating the second inlet valve and both of the exhaust valves, and an electronic controller is arranged to control operation of the first and second electronically controlled valves.

3. The system of claim 2, wherein the electronic controller is operable in a first mode of operation to control the first electronically controlled valve to deactivate all of the associated inlet valves when increased swirl is required in the cylinders of the engine.

4. The system of claim 2, wherein the electronic controller is operable in a second mode of operation when deactivation of the deactivatable cylinder is required to control the first electronically controlled valve to deactivate the first inlet valves in all cylinders of the engine and to control the second electronically controlled valve to deactivate the second inlet valve and both of the exhaust valves of the cylinder to be deactivated.

5. The system of claim 2, wherein the engine has more than one deactivatable cylinder and the electronic controller is operable in a second mode of operation when deactivation of the deactivatable cylinders is required to control the first electronically controlled valve to deactivate the first inlet valves in all cylinders of the engine and to control the second electronically controlled valve to deactivate the second inlet valves and both of the exhaust valves of all of the cylinders to be deactivated.

6. The system of claim 2, wherein each valve of the engine has a valve actuating system including a hydraulic lash adjuster and the devices to deactivate the first inlet valves of the cylinders of the engine are hydraulically switchable hydraulic lash adjusters.

7. The system of claim 6, wherein the devices to deactivate the second inlet valve and both exhaust valves of each deactivatable cylinder of the engine are hydraulically switchable hydraulic lash adjusters.

8. The system of claim 2, wherein each valve of the engine has a valve actuating system including a roller finger follower and the devices to deactivate the first inlet valves of the cylinders of the engine are hydraulically switchable roller finger followers.

9. The system of claim 8, wherein the devices to deactivate the second inlet valve and both exhaust valves of each deactivatable cylinder of the engine are hydraulically switchable roller finger followers.

10. The system of claim 2, wherein the first electronically controlled valve is operable to supply fluid at pressure to the devices for deactivating the first inlet valves when deactivation of the first inlet valves is required and cut off the supply of fluid at pressure to the devices for deactivating the first inlet valves when the first inlet valves are required to operate normally.

11. The system of claim 2, wherein the second electronically controlled valve is operable to supply pressurized fluid to the devices for deactivating the second inlet valve and both of the exhaust valves when deactivation of the second inlet valve and both of the exhaust valves is required and cut off the supply of pressurized fluid to the devices for deactivating the second inlet valve and both of the exhaust valves when the first inlet valves are required to operate normally.

12. The system of claim 2, wherein the electronic controller comprises more than one electronic controller.

13. A method, comprising:
operating an engine valve deactivation system of an engine having two or more cylinders, each cylinder with two inlet valves and two exhaust valves, wherein at least one of the cylinders is deactivatable while at a same time a remaining set of the cylinders is normally operated, including:
deactivating a first one of the two inlet valves of each of the cylinders via a first pressurized fluid supply when an engine load is lower than a first threshold to promote swirl in each of the cylinders; and
deactivating the first one of the two inlet valves of each of the cylinders via the first pressurized fluid supply, further deactivating a second of the two inlet valves and both exhaust valves of each deactivatable cylinder via a second pressurized fluid supply, and deactivating each of the deactivatable cylinders at the same time as normally operating the remaining set of cylinders when the engine load is lower than a second threshold, where the second threshold is lower than the first threshold, and where swirl is promoted in the remaining set of cylinders that is normally operated at the same time that each of the deactivatable cylinders are deactivated.

14. The method of claim 13, wherein the first one of the two inlet valves is deactivated via opening a first electronically controlled valve to flow the first pressurized fluid supply to a deactivating device of the first inlet valve.

15. The method of claim 13, wherein the second of the two inlet valves and both of the exhaust valves are deactivated via opening a second electronically controlled valve to flow the second pressurized fluid supply to deactivating devices of the second of the two inlet valves and both of the exhaust valves.

16. A method for an engine valve deactivation system comprising:
during a first mode, opening a first electronically controlled valve arranged to control a first flow of pressurized fluid to a device for deactivating a first inlet valve of each of a plurality of cylinders, wherein at least one of the plurality of cylinders is deactivatable;

during a second mode, deactivating the at least one deactivatable cylinder while operating a remaining set of the plurality of cylinders normally, opening the first electronically controlled valve to control the first flow of pressurized fluid to deactivate the first inlet valve of each of the plurality of cylinders, and opening a second electronically controlled valve arranged to control a second flow of pressurized fluid to devices for deactivating a second inlet valve and both exhaust valves of each deactivated cylinder; and during a normal mode, closing the first and the second electronically controlled valves.

17. The method of claim 16, further comprising operating in the first mode in response to engine conditions where there is an increased desired swirl in each cylinder.

18. The method of claim 16, further comprising operating in the second mode in response to engine conditions where cylinder deactivation is requested.

19. The method of claim 16, wherein the devices to deactivate the first inlet valve, the second inlet valve and both exhaust valves of the cylinders of the engine are hydraulically switchable roller finger followers.

* * * * *